United States Patent
Boriack

(10) Patent No.: US 9,951,888 B2
(45) Date of Patent: Apr. 24, 2018

(54) LINE SEPARATING DEVICE FOR AN AGRICULTURAL IMPLEMENT

(71) Applicant: CNH Industrial America LLC, New Holland, PA (US)

(72) Inventor: Cale Nolan Boriack, Lititz, PA (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/242,163

(22) Filed: Aug. 19, 2016

(65) Prior Publication Data

US 2018/0051828 A1 Feb. 22, 2018

(51) Int. Cl.
| F16L 3/22 | (2006.01) |
| F16L 3/223 | (2006.01) |
| F16L 3/06 | (2006.01) |
| A01B 76/00 | (2006.01) |

(52) U.S. Cl.
CPC .............. *F16L 3/223* (2013.01); *A01B 76/00* (2013.01); *F16L 3/06* (2013.01)

(58) Field of Classification Search
CPC ....................................................... F16L 2/222
See application file for complete search history.

(56) References Cited

U.S. PATENT DOCUMENTS

| 4,234,012 A | 11/1980 | Schupback |
| 4,775,286 A | 10/1988 | Gillette et al. |
| 5,027,478 A * | 7/1991 | Suhr ...................... B65H 75/36 137/355.16 |
| 5,082,217 A | 1/1992 | Parker et al. |
| 6,375,017 B1 | 4/2002 | Schattner et al. |
| D457,173 S | 5/2002 | Harden et al. |
| 6,552,270 B1 * | 4/2003 | Heacox ................... F16L 3/233 174/135 |
| 6,752,360 B2 | 6/2004 | Bennett |
| 6,996,943 B2 | 2/2006 | Denier et al. |
| 7,017,676 B2 | 3/2006 | Neufeld et al. |
| 7,143,839 B2 | 12/2006 | Neufeld et al. |
| 7,500,644 B2 * | 3/2009 | Naudet ................... F02C 7/222 174/146 |

(Continued)

FOREIGN PATENT DOCUMENTS

| FR | 2836980 A1 | 9/2003 |
| WO | 2015131288 A1 | 9/2015 |

*Primary Examiner* — Amy J. Sterling
(74) *Attorney, Agent, or Firm* — Rebecca L. Henkel; Richard K. DeMille

(57) ABSTRACT

A line separating/management device for an agricultural system includes multiple recesses that each receive a respective line and each is formed on a peripheral edge of a body of the line separating/management device. The line separating/management device also includes an opening extending through the body along a longitudinal axis of the line separating/management device, wherein the body surrounds the opening along a circumferential axis of the line separating/management device, wherein the opening receives another line. The line separating/management device further includes a fastening structure having a concave surface formed on the peripheral edge of the body, wherein the fastening structure receives a fastener to secure a further line to the concave surface.

12 Claims, 4 Drawing Sheets

(56) References Cited

U.S. PATENT DOCUMENTS

| | | | |
|---|---|---|---|
| 8,240,620 B2* | 8/2012 | Walter | F16L 3/223 |
| | | | 174/146 |
| 8,387,329 B2* | 3/2013 | Stevens | E04C 5/0604 |
| | | | 52/220.3 |
| 8,657,324 B2 | 2/2014 | Waldner et al. | |
| 8,668,173 B2 | 3/2014 | Knobloch | |
| D719,013 S | 12/2014 | St. John et al. | |
| 9,534,708 B2* | 1/2017 | Cripps, II | F16L 3/222 |
| 2007/0120023 A1* | 5/2007 | Martinez | E02F 9/2275 |
| | | | 248/75 |
| 2013/0000072 A1 | 1/2013 | Jones et al. | |
| 2015/0034776 A1 | 2/2015 | St. John et al. | |
| 2015/0327429 A1 | 11/2015 | Koch | |

* cited by examiner

LINE SEPARATING DEVICE FOR AN AGRICULTURAL IMPLEMENT

BACKGROUND

The present disclosure relates generally to managing lines of an agricultural implement. In particular, the present disclosure relates to improving management by separating multiple lines (e.g., of multiple types) from one another on the agricultural implement.

An agricultural implement may include a toolbar that includes a number of row units. Each row unit may be configured to perform an agricultural operation such as planting fertilizing, or spraying. In the case of a planter or seeder, each row unit may be configured to deposit seeds at a desired depth beneath the soil surface of a field, thereby establishing rows of planted seeds. For example, each row unit typically includes components (e.g., a coulter(s), knife or knives, closing disc(s), packer wheel(s), etc.) for forming a seeding path (e.g., trench) for seed deposition into the soil, depositing the seeds, covering the seed with soil, and packing the soil over the deposited seed. The toolbar may also include moving parts, such as wing segments. The agricultural implements may include hydraulic fluid distribution system(s), compressed air distribution system(s), fertilizer distribution system(s), chemical distribution system(s), electrical wiring system(s), vacuum distribution system(s), seed distribution system(s), and the like. The systems may each include at least one line, such as a hose, cable, harness, or a combination thereof, among other lines, to achieve the purpose of the system.

When manipulating or operating the agricultural implement, the lines of the systems may get caught in pinch points (e.g., between wing segments, etc.) of the agricultural implement or blades and/or discs of the row units. Additionally, the lines may chafe against each other or portions of the agricultural implement when the agricultural implement is in operation. Moreover, rerouting lines of different systems (e.g., when replacing, removing, and/or adding different systems) may be inefficient if the lines are coupled to the agricultural implement using devices that do not enable ease of rerouting.

BRIEF DESCRIPTION

Certain embodiments commensurate in scope with the present disclosure are summarized below. These embodiments are not intended to limit the scope of the disclosure, but rather these embodiments are intended only to provide a brief summary of possible forms of the disclosure. Indeed, the disclosure may encompass a variety of forms that may be similar to or different from the embodiments set forth below.

In a first embodiment, a line separating/management device for an agricultural system includes multiple recesses that each receive a respective line and each is formed on a peripheral edge of a body of the line separating/management device. The line separating/management device also includes an opening extending through the body along a longitudinal axis of the line separating/management device, wherein the body surrounds the opening along a circumferential axis of the line separating/management device, wherein the opening receives another line. The line separating/management device further includes a fastening structure having a concave surface formed on the peripheral edge of the body, wherein the fastening structure receives a fastener to secure a further line to the concave surface.

In a second embodiment, a line separating/management device for an agricultural system that includes multiple recesses, which each receive a respective line and is formed on a peripheral edge of a body of the line separating/management device. The line separating/management device also includes an opening extending through the body along a longitudinal axis of the line separating/management device, wherein the body surrounds the opening along a circumferential axis of the line separating/management device, wherein the opening receives another line. The line separating/management device further includes a mounting slot that enables the line management device to mount to a plate of the agricultural system.

In a third embodiment, a line separating/management device includes multiple recesses, which each receive a respective line and each is formed on a peripheral edge of a body of the line separating/management device. The line separating/management device also includes a fastening structure having a concave surface formed on the peripheral edge of the body, wherein the fastening structure receives a fastener to secure a further line to the concave surface. The line separating/management device further includes a mounting slot that enables the line management device to mount to a plate of the agricultural system.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
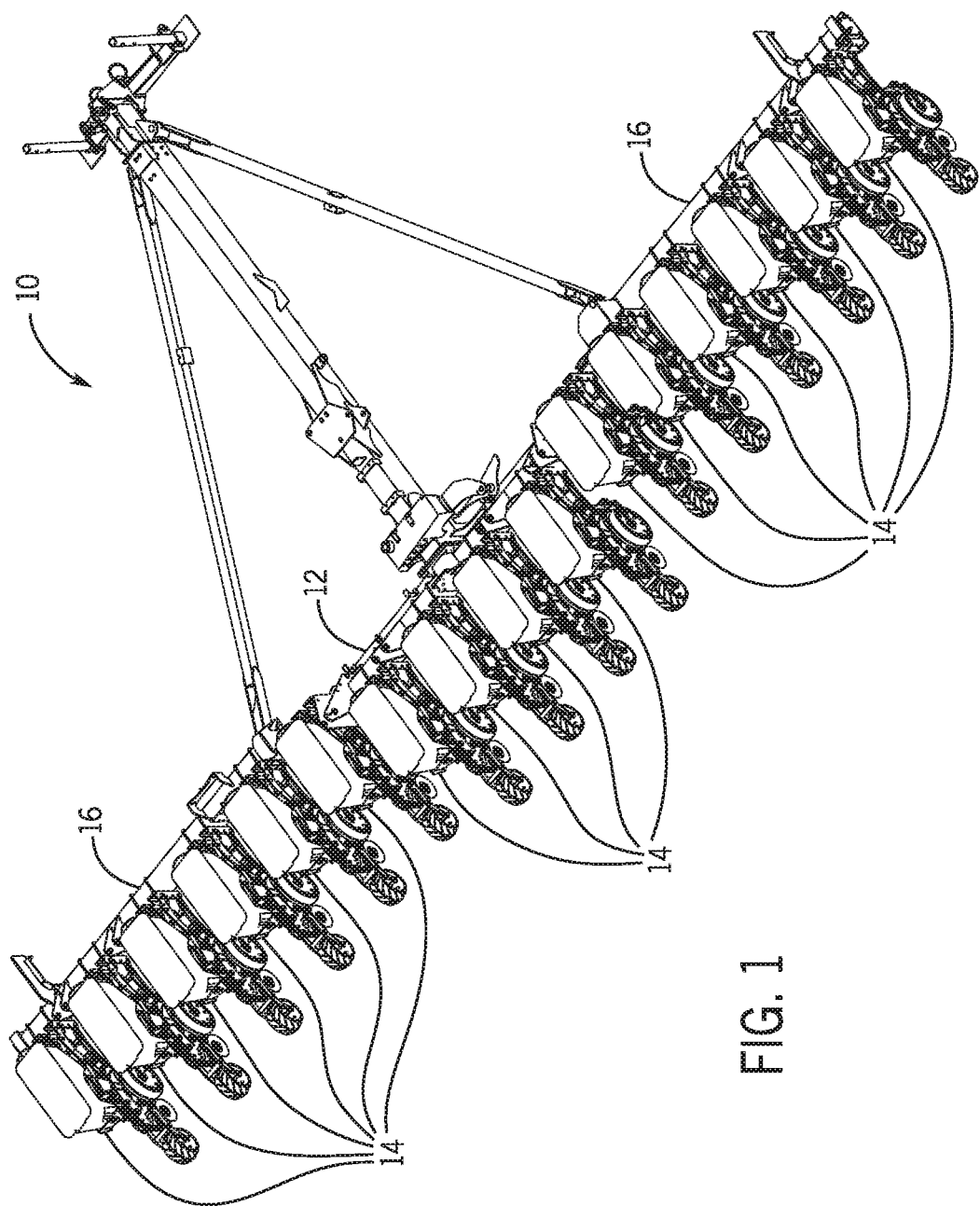
FIG. 1 is a perspective view of an agricultural implement that includes a toolbar, in accordance with an embodiment of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

The present disclosure relates generally to managing lines mounted on a toolbar of an agricultural system. The agricultural system may include an agricultural vehicle (e.g., a tractor) or an agricultural implement (e.g., a planter, rototiller, cultivator, seeder, applicator, etc.). In particular, the present disclosure relates to improving management by separating multiple lines (e.g., of multiple types) from one another. Accordingly, a line separating/management device is disclosed which is used to manage and separate multiple lines (e.g., of multiple types). In particular, one embodiment of the present disclosure includes a line separating/management device for an agricultural system includes multiple recesses that each receive a respective line and each is formed on a peripheral edge of a body of the line separating/management device. The line separating/management device also includes an opening extending through the body along a longitudinal axis of the line separating/management device, wherein the body surrounds the opening along a circumferential axis of the line separating/management device, wherein the opening receives another line. The line separating/management device further includes a fastening structure having a concave surface formed on the peripheral edge of the body, wherein the fastening structure receives a fastener to secure a further line to the concave surface. While the line separating/management device is described as applied to a toolbar of an agricultural implement, it should be understood that the line separating/management device may be used elsewhere, such as other portions of the agricultural implement, on agricultural vehicles, or any suitable implement or vehicle where separation/management of lines is desired.

FIG. 1 is a perspective view of an agricultural implement 10 that includes a toolbar 12, in accordance with an embodiment of the present disclosure. The agricultural implement 10 may be coupled to an agricultural vehicle (e.g., a tractor), which may tow the agricultural implement through a field. A number of systems may be coupled to the toolbar 12. The systems may include a hydraulic fluid distribution system(s), compressed air distribution system(s), fertilizer distribution system(s), chemical distribution system(s), electrical wiring system(s), vacuum distribution system(s), seed distribution system(s), and the like. The systems may each include at least one line, such as a hose, cable, harness, or a combination thereof, among other lines, to achieve the purpose of the system. For example, a hydraulic fluid distribution system may include multiple lines, such as hoses to provide hydraulic fluid to various components (e.g., hydraulic cylinders, hydraulic meters, etc.) mounted on the toolbar 12. A compressed air system may similarly include multiple lines, such as hoses, to provide compressed air to various components (e.g., the row units 14) mounted on the toolbar 12. A fertilizer system may include multiple lines, such as hoses, to provide fertilizer to row units 14 mounted on the toolbar 12. An electrical wiring system may include multiple lines, such as harnesses, to provide electricity to actuators of mounted on the toolbar 12. As used in the present disclosure, the term "line" refers to any suitable type of line, such as a hose, a cable, a harness (e.g., including multiple lines), or similar element.

The toolbar 12 includes a number of row units 14 (e.g., having a coulter(s), knife or knives, closing disc(s), packer wheel(s), etc.) and moving parts, such as wing segments 16 of the toolbar 12. It may be desirable to restrain the line(s) of the system(s) such that the line(s) are remotely positioned from pinch points (e.g., between wing segments, etc.) and/or remotely positioned from blades and/or discs of the row units 14. It may further be desirable to maintain a degree of separation between line(s) to substantially reduce or eliminate the possibility of chafing. Additionally, it may be useful to enable routing line(s) of different systems at different times (e.g., between seasons, etc.).

Figure 2:
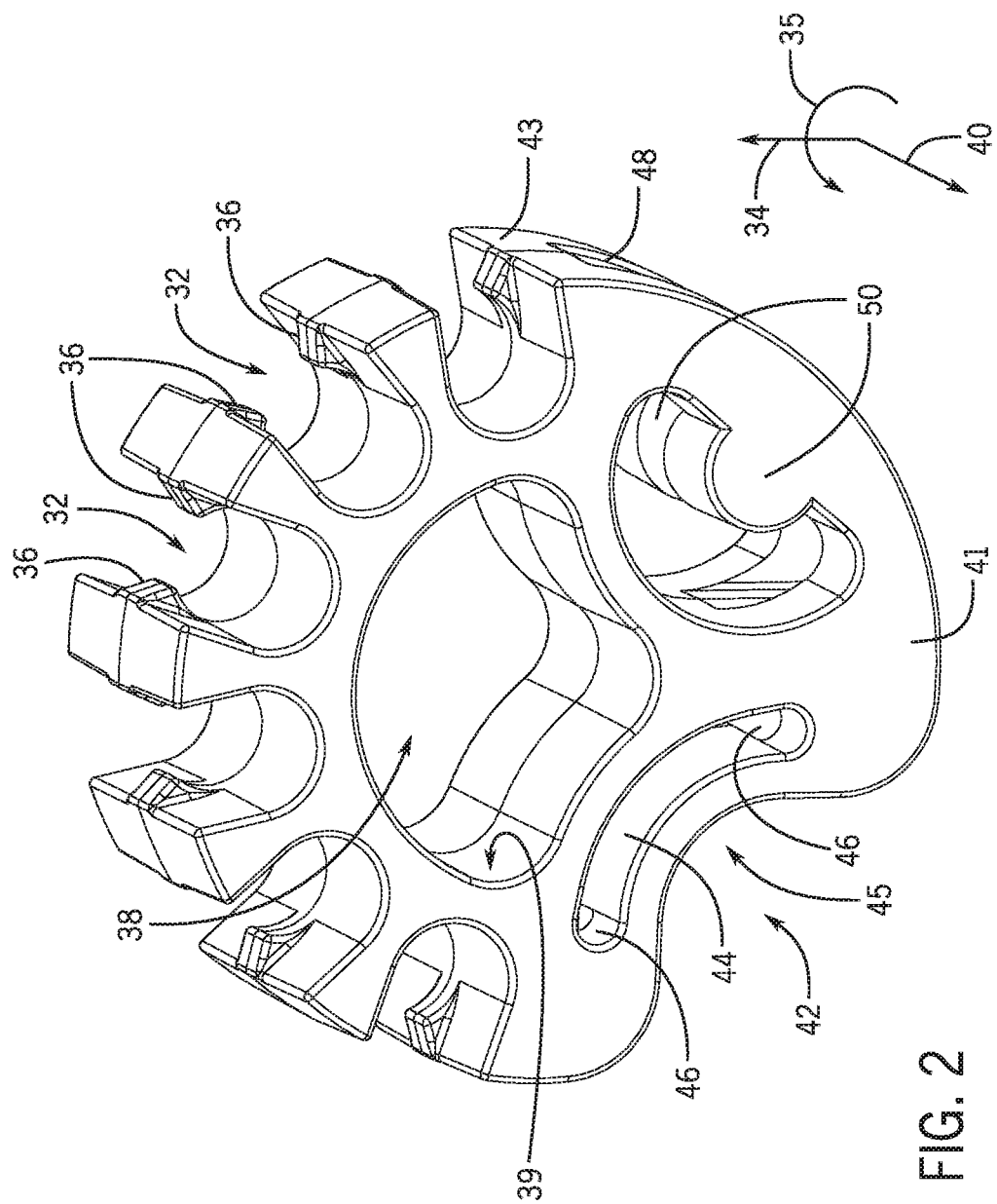
FIG. 2 is a first perspective view of a line separating/management device, in accordance with an embodiment of the present disclosure.

With this in mind, FIG. 2 is a first perspective view of the line separating/management device 30, in accordance with an embodiment of the present disclosure. The line separating/management device 30 may be formed from any suitable material, such as plastic, metal, rubber, and the like, that enables the line separating/management device 30 to capture a line and block the line from slipping out of portions of the line separating/management device 30. For example, the line separating/management device 30 may be made of nylon, polyethylene, polypropylene, and the like, or any combination thereof. In some embodiments, the line separating/management device 30 may be injection-molded.

The line separating/management device 30 includes multiple arcuate recesses 32, each configured to receive a respective line. The line separating/management device 30 is substantially disc-shaped, and the recesses are formed along an edge (e.g., extending about a radial axis 34 and along a circumferential axis 35) of the line separating/management device 30. In the illustrated embodiment, each recess 32 includes two projections 36 configured to retain or hold a line in the recess 32. For example, a line may be aligned with a recess 32 and pushed past the two projections 36, such that the two projections 36 capture the line and block the line from slipping out of the recess 32. In the illustrated embodiment, the line separating/management device 30 has six recesses 32. In other embodiments, the line separating/management device 30 may have more or fewer than six recesses (e.g., two, four, eight, or ten recesses). In the illustrated embodiment, each recess 32 is configured to receive a ⅜ inch diameter line (approximately a 9.53 millimeter (mm) line). Accordingly, the shape, size, and dimensions of the recesses 32 are the same as one another. For example, a number of ⅜ inch diameter lines, such as fertilizer lines, compressed air lines, etc., may be coupled to the toolbar 12 by the line separating/management device 30. In other embodiments, the recesses 32 may be configured for other line diameter sizes (e.g., 3/16 inch (4.76 mm), ¼ inch (6.35 mm), 5/16 inch (7.94 mm), 7/16 inch (11.11 mm), or ½ inch (12.7 mm) diameter lines). In some embodiments, the separating device 30 may have recesses 32 of a variety of sizes to accommodate for a variety of line diameters. In some embodiments, the recesses 32 may not be arcuate in shape, but may instead be angular (e.g., forming a triangle, quadrilateral, etc.).

The line separating/management device 30 may include an opening 38 that extends through the line separating/management device 30 along a longitudinal axis 40 of the line separating/management device 30. The opening 38 may be surrounded by an inner surface 39 of a body 41 of the line separating/management device 30 along the circumferential axis 35. The opening 38 may be shaped and/or dimensioned to enable a wiring harness to pass through. In the illustrated embodiment, the opening 38 is larger than each of the recesses 32, to enable a fertilizer wiring harness (which is larger than a ⅜ inch diameter line) to pass through the opening 38. In some embodiments, the opening 38 may be large enough to enable several harnesses and/or several lines to pass through. As illustrated, a fastener is not included to secure the line (e.g., the wiring harness) to the line separating/management device 30. However, in some embodiments, a fastener may be included to secure one or more harnesses and/or lines to the line separating/management device 30 at the opening 38. In alternative embodiments, the opening 38 may be larger or smaller than illustrated in FIG. 2 (e.g., relative to the line separating/management device 30), and may be of a different shape (e.g., circular, arcuate, triangular, quadrilateral, and the like). In some embodiments, the line separating/management device 30 may include one or more recesses (e.g., 32) that are configured to receive the wiring harness (which may be larger than a ⅜ inch diameter line), multiple wiring harnesses, and/or multiples lines. In one embodiment, the line separating/management device 30 may not include the opening 38, and instead include the one or more recesses.

In the illustrated embodiment, the line separating/management device 30 includes a fastening structure 42 configured to receive a fastener, such as a cable tie, tie-wrap, hose tie, zip tie, and the like. In the illustrated embodiment, the fastening structure 42 includes a concave surface 45 formed on a peripheral edge (e.g., corresponding to an exterior peripheral surface 43) of the body 41 of the line separating/management device 30. The fastening structure 42 may be shaped and/or dimensioned to enable a harness to be mounted to the line separating/management device 30. In some embodiments, the surface 45 may be arcuate, angular, or of any shape suitable for enabling mounting of a harness or other type of line. In the illustrated embodiment, the concave shape of the surface 45 has a diameter larger than the diameter of each of the recesses 32, to facilitate mounting a harness or other line that has a diameter larger than a ⅜ inch diameter line. The fastening structure 42 includes an arcuate opening 44 configured to receive a fastener. As illustrated, the opening 44 extends through the body 41 of the line separating/management device 30 along the longitudinal axis 40. In some embodiments, the opening 44 may be enclosed or partially enclosed within the body 41 of the line separating/management device 30, such that the opening 44 is not visible when the line separating/management device 30 is viewed along the longitudinal axis 40. The body 41 of the line separating/management device 30 may include apertures 46 at the peripheral ends of the opening 44 that enable a fastener to fasten a harness or other type of line to the line separating/management device 30. In some embodiments, the opening 44 may be configured to enable a cable tie, tie-wrap, hose tie, zip tie, and the like, to couple the harness or other line to the line separating/management device 30. For example, a cable tie may extend through a first aperture 46, extend through the opening 44, extend through the second aperture 46, extend around a line, and fasten to itself, to couple the line to the concave surface 45 of the line separating/management device 30. In some embodiments, the opening 44 may be configured, shaped, and/or dimensioned to enable other types of fasteners to fasten the harness or other line to the line separating/management device 30 and/or to enable mounting of other line diameter sizes.

In the illustrated embodiment, the line separating/management device 30 includes a mounting slot 48 that enables the line separating/management device 30 to mount to a portion of the toolbar or other structure on the implement. For example, the mounting slot 48 may be configured, shaped, dimensioned, or a combination thereof, to mount to a plate of the toolbar. The line separating/management device 30 includes mounting features or protrusions 50 that are configured to couple the line separating/management device 30 to the toolbar. In some embodiments, the toolbar includes a plate with a mounting point (e.g., a hole) for receiving the protrusions 50. In the illustrated embodiment, the protrusions 50 include two circular structures that are ramped toward one another in an inward direction (e.g., toward a center of the line separating/management device 30) along the radial axis 34. That is, each protrusion may be positioned on each longitudinal side of the mounting slot 48. Accordingly, as the slot 48 engages the plate, the protrusions 50 engage the mounting point when aligned with the mounting point, thereby securing the line separating/management device 30 to the plate.

While the illustrated embodiment of the line separating/management device 30 includes the recesses 32, the opening 38, the fastening structure 42, the mounting slot 48, and the two protrusions 50, among other features, it should be understood that only one, two, three, or more of these features may be included in the line separating/management device 30. For example, the line separating/management device 30 may include two or more openings 38. As another example, the line separating/management device 30 may include two or more fastening structures 42. Similarly, the line separating/management device 30 may include two or more mounting slots 48 and/or two or more protrusions 50. In some embodiments, the line separating/management device 30 may be configured to mount to other portions of the toolbar or agricultural implement, or any other suitable implement or vehicle where separation/management of lines is desired. In alternative embodiments, the protrusions 50 may not be circular or ramped, and may instead include other suitable features that enable such a fastener to engage a mounting point and secure a line to a mounting surface of the toolbar, implement, or other suitable mounting surface.

Figure 3:
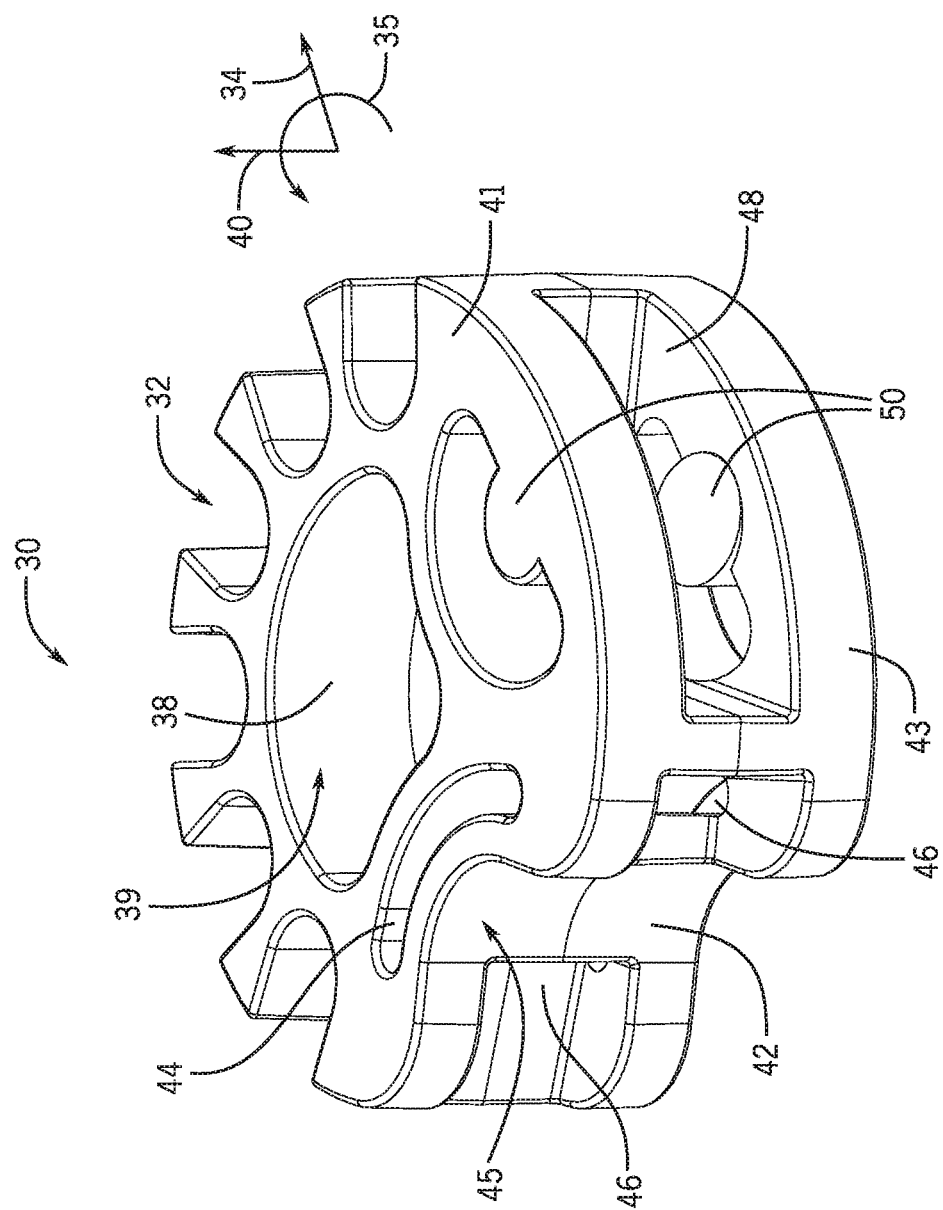
FIG. 3 is a second perspective view of the line separating/management device of FIG. 2, in accordance with an embodiment of the present disclosure.

FIG. 3 is a second perspective view of the line separating/management device 30 of FIG. 2, in accordance with an embodiment of the present disclosure. As illustrated, the fastening structure 42 is shaped and/or dimensioned to enable a harness to be mounted to the line separating/management device 30. Additionally, the arcuate opening 44 is configured to receive a fastener. For example, a cable tie may extend through a first aperture 46, extend through the opening 44, extend through the second aperture 46, extend around a line, and fasten to itself, to couple the line to the concave surface 45 of the line separating/management device 30.

FIG. 3 also shows the mounting slot 48 that enables the line separating/management device 30 to mount to a portion (e.g., a plate) of the toolbar. As illustrated, the mounting slot 48 is configured, shaped, dimensioned, or a combination thereof, to mount to a mounting point in the plate of the toolbar. The two protrusions 50 are circular structures that are ramped towards each other in an inward direction along the longitudinal axis 34 of the line separating/management device 30, such that the structures may be conveniently slipped onto the plate with the mounting point, but may be removed by prying apart the two structures of the mounting slot 48.

Figure 4:
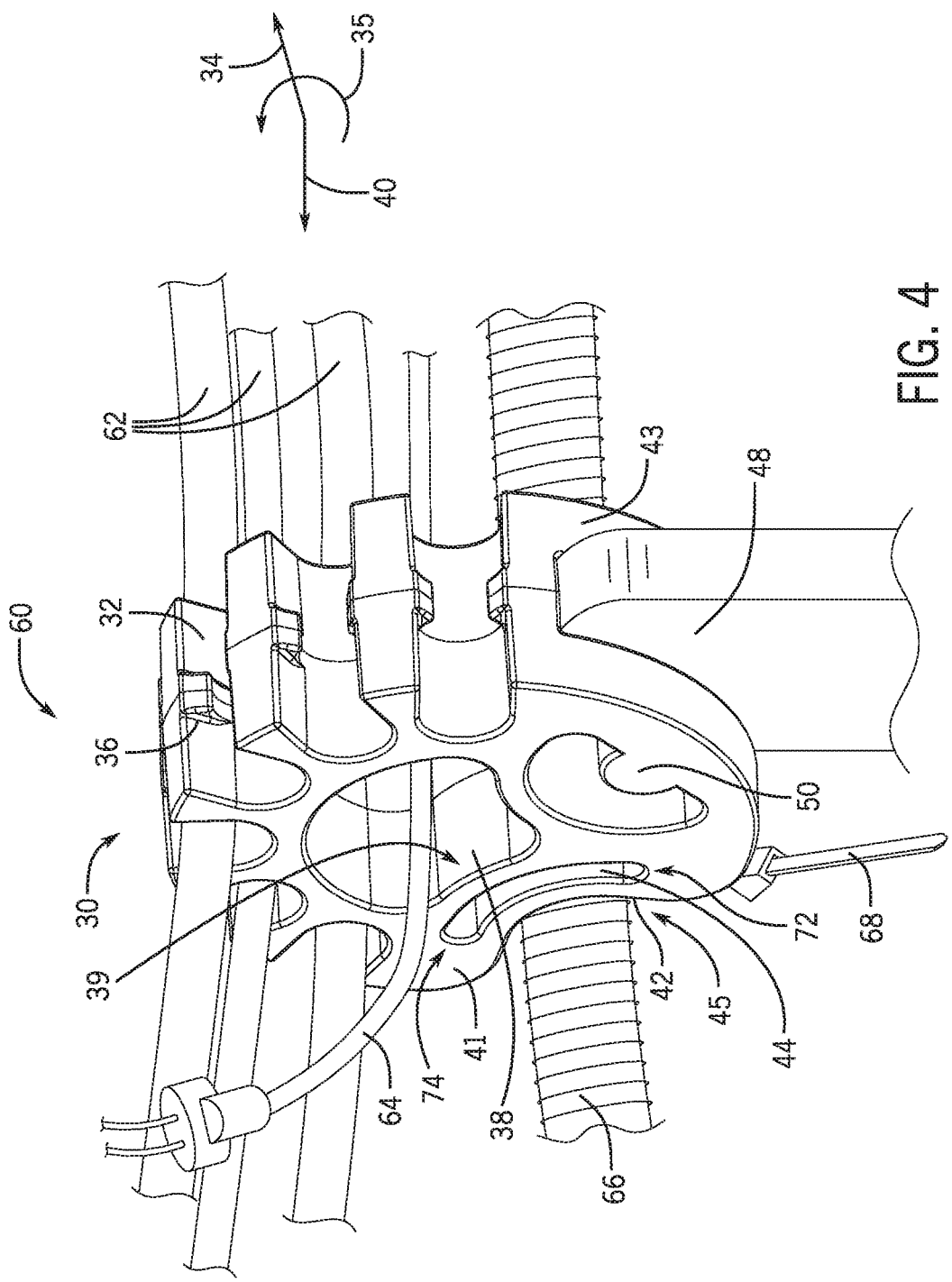
FIG. 4 is a perspective view of the line separating/management device of FIG. 2 mounted on a toolbar, in accordance with an embodiment of the present disclosure.

FIG. 4 is a perspective view of the line separating/management device 30 of FIG. 2 mounted on a toolbar, in accordance with an embodiment of the present disclosure. As illustrated, three ⅜ inch diameter lines 62 are disposed within respective recesses 32 and are secured within the recesses 32 by the projections 36. The ⅜ inch diameter lines 62 may include hydraulic line(s), compressed air line(s), fertilizer line(s), chemical line(s), electrical line(s), vacuum line(s), seed line(s), etc. Additionally, a fertilizer wiring harness 64 extends through the opening 38. Another wiring harness 66 is coupled to the line separating/management device 30 at the fastening structure 42. The wiring harness 66 is fastened to the line separating/management device 30 by a cable tie 68, which extends through a first aperture 46 at a first peripheral end 72 of the opening 44, extends through the opening 44, extends through a second aperture 46 at a second peripheral end 74 of the opening 44, extend around the wiring harness 66, and fastens to itself. The line separating/management device 30 is mounted to a mounting plate 70 of the toolbar via a mounting point in the mounting plate 70. As illustrated, the slot 48 may engage the plate 70 and the two protrusions 50 may engage the mounting point, thereby securing the line separating/management device 30 to the plate 70. The ramping of the protrusions 50 enable the protrusions 50 to both snap into place and to block removal from the line separating/management device 30 from the plate 70.

While only certain features of the invention have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A line separating and management device for an agricultural system, comprising:
   a body having a plurality of recesses each configured to receive a respective line along a longitudinal axis of the body, wherein each recess of the plurality of recesses is formed on a peripheral edge of the body of the line separating and management device;
   wherein the body has a mounting slot configured to enable the line separating and management device to mount to a plate of the agricultural system, wherein the mounting slot is formed by a first surface and a second surface each perpendicular to the longitudinal axis, wherein the first surface and the second surface are configured to surround the plate when the line separating and management device is mounted to the plate.

2. The line separating and management device of claim 1, comprising a mounting feature positioned proximate to the mounting slot and configured to mount to a mounting point of the plate.

3. The line separating and management device of claim 2, wherein the mounting feature comprises at least one protrusion, the mounting point comprises a hole in the plate, and the at least one protrusion is configured to engage the hole.

4. The line separating and management device of claim 3, wherein the at least one protrusion comprises two circular protrusions, one on each longitudinal side of the mounting slot.

5. The line separating and management device of claim 4, wherein the two circular protrusions are ramped toward one another in an inward direction along a radial axis of the line separating and management device.

6. The line separating and management device of claim 1, wherein the line separating and management device is formed from nylon, polyethylene, polypropylene, or any combination thereof.

7. The line separating and management device of claim 1, wherein the body has an opening extending along the longitudinal axis and management device, wherein the body surrounds the opening along a circumferential axis of the line separating and management device, and the opening is configured receive another line.

8. A line separating and management device, comprising:
   a body having an opening extending along a longitudinal axis of the line separating and management device, wherein the body surrounds the opening along a circumferential axis of the line separating and management device, and the opening is configured receive another line; and
   wherein the body has a mounting slot configured to enable the line separating and management device to mount to a plate of the agricultural system, wherein the mounting slot is formed by a first surface and a second surface each perpendicular to the longitudinal axis, wherein the first surface and the second surface are configured to surround the plate when the line separating and management device is mounted to the plate.

9. The line separating and management device of claim 8, comprising a fastening structure having a concave surface formed on the peripheral edge of the body, wherein the fastening structure is configured to receive a fastener to secure a further line to the concave surface, wherein the fastening structure comprises an arcuate opening configured to receive the fastener.

10. The line separating and management device of claim 9, wherein the body comprises a first aperture at a first peripheral end of the arcuate opening and a second aperture at a second peripheral end of the arcuate opening.

11. The line separating and management device of claim 10, wherein the arcuate opening is configured to enable the fastener to extend through the first aperture and to extend through the second aperture to facilitate securing the further line to the concave surface.

12. The line separating and management device of claim 9, wherein the arcuate opening extends through the body along the longitudinal axis.

* * * * *